US010779218B2

(12) United States Patent
Sakata et al.

(10) Patent No.: US 10,779,218 B2
(45) Date of Patent: Sep. 15, 2020

(54) DATA MANAGEMENT DEVICE, WIRELESS COMMUNICATION DEVICE AND WIRELESS MULTIHOP NETWORK

(71) Applicant: KABUSHIKI KAISHA TOSHIBA, Minato-ku (JP)

(72) Inventors: Ren Sakata, Yokohama (JP); Hiroki Kudo, Kawasaki (JP); Sakie Nagakubo, Kawasaki (JP); Suh Wuk Kim, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/298,121

(22) Filed: Mar. 11, 2019

(65) Prior Publication Data

US 2020/0084690 A1 Mar. 12, 2020

(30) Foreign Application Priority Data

Sep. 11, 2018 (JP) ................................ 2018-169792

(51) Int. Cl.

| | |
|---|---|
| ***H04W 28/02*** | (2009.01) |
| ***H04W 84/18*** | (2009.01) |
| ***H04W 40/26*** | (2009.01) |
| ***H04L 12/733*** | (2013.01) |
| ***H04W 40/24*** | (2009.01) |
| ***H04W 40/02*** | (2009.01) |
| ***H04W 72/04*** | (2009.01) |

(52) U.S. Cl.

CPC ............. *H04W 40/26* (2013.01); *H04L 45/20* (2013.01); *H04W 28/0289* (2013.01); *H04W 40/02* (2013.01); *H04W 40/248* (2013.01); *H04W 72/0446* (2013.01); *H04W 84/18* (2013.01)

(58) Field of Classification Search

CPC .............................. H04L 45/20; H04W 84/18

USPC ........................................................ 370/229

See application file for complete search history.

(56) References Cited

U.S. PATENT DOCUMENTS

| | | | | |
|---|---|---|---|---|
| 10,080,187 | B2 | 9/2018 | Sakata et al. | |
| 2008/0107075 | A1* | 5/2008 | Ramachandran ....... | H04L 45/00 370/331 |
| 2014/0376527 | A1* | 12/2014 | Takatsuka .............. | H04L 45/20 370/337 |

FOREIGN PATENT DOCUMENTS

| | | |
|---|---|---|
| JP | 5880223 | 3/2016 |
| JP | 2016-54349 | 4/2016 |

OTHER PUBLICATIONS

Vasseur, J., et al. "Routing Metrics Used for Path Calculation in Low-Power and Lossy Networks", Internet Engineering Task Force (IETF) Request for Comments: 6551, https://tools.ietf.org/html/rfc6, 551, 2012, 30 pages.

* cited by examiner

*Primary Examiner* — Angel T Brockman

(74) *Attorney, Agent, or Firm* — Oblon, McClelland, Maier & Neustadt, L.L.P.

(57) ABSTRACT

According to one embodiment, a data management device collecting data from a plurality of wireless nodes in a wireless multihop network is provided. The data management device includes a transceiver configured to transmit and receive a radio signal; and controlling circuitry. The controlling circuitry determines a first range of numbers of hops from the data management device for execution of route control in the wireless multihop network, performs the route control for the first range of numbers of hops and does not perform the route control beyond the first range of numbers of hops from the data management device.

8 Claims, 17 Drawing Sheets

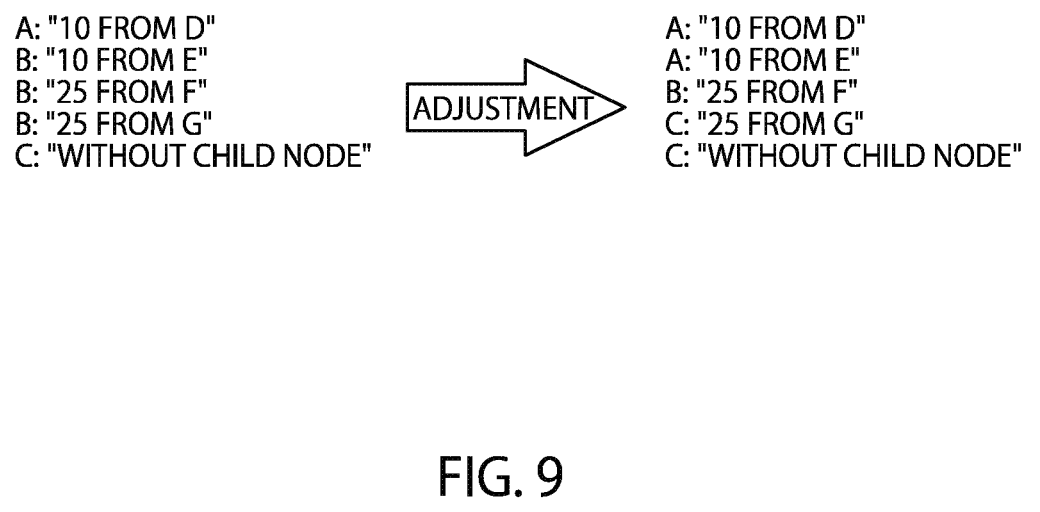

A: "10 FROM D"
B: "10 FROM E"
B: "25 FROM F"
B: "25 FROM G"
C: "WITHOUT CHILD NODE"

ADJUSTMENT

A: "10 FROM D"
A: "10 FROM E"
B: "25 FROM F"
C: "25 FROM G"
C: "WITHOUT CHILD NODE"

FIG. 9

| OWN NODE ID | DESTINATION NODE ID | DATA OF OWN NODE | DATA OF DESCENDANT NODES | --- | PATH COST | REQUIRED TRANSMISSION DATA SIZE |
| --- | --- | --- | --- | --- | --- | --- |

FIG. 13

DATA MANAGEMENT DEVICE, WIRELESS COMMUNICATION DEVICE AND WIRELESS MULTIHOP NETWORK

CROSS REFERENCE TO RELATED APPLICATIONS

This application is based upon and claims the benefit of priority from the prior Japanese Patent Application No. 2018-169792, filed on Sep. 11, 2018, the entire contents of which are incorporated herein by reference.

FIELD

Embodiments described herein relate to a data management device, a data management method, a wireless communication device, a wireless communication method, a wireless multihop network and a computer program.

BACKGROUND

A wireless multihop network, a network in which a plurality of nodes are connected in a mesh shape, does not require a communication line and is excellent in maintainability. Therefore, a sensor network for monitoring a wide range and the like can be easily installed and maintained. A mechanism is known in which time division communication is applied to the wireless multihop network so as to cause the nodes to sleep in time zones unrelated to communication. The mechanism enables saving of energy resources (power saving).

In the wireless multihop network, since data is collected to a concentrator by relaying communication between nodes, it is necessary to determine a parent node to be a relay destination of data of each node. If there are a plurality of parent node candidates, it is necessary to select a parent node from among the parent node candidates. As a method for selecting a parent node, a scheme called ETX (Expected Transmission) is widely known. In the ETX scheme, a parent node with such a route that increases a communication success rate can be selected.

In the EXT scheme, however, there is a problem that congestion occurs due to concentration of data to a part of nodes on a route. When congestion occurs, it may be impossible to relay received data, or received data may be lost.

BRIEF DESCRIPTION OF THE DRAWINGS

FIG. 9 is a diagram continued from FIG. 8;

FIG. 13 is a diagram showing an example of a packet format;

DETAILED DESCRIPTION

According to one embodiment, a data management device collecting data from a plurality of wireless nodes in a wireless multihop network is provided. The data management device includes a transceiver configured to transmit and receive a radio signal; and controlling circuitry. The controlling circuitry determines a first range of numbers of hops from the data management device for execution of route control in the wireless multihop network, performs the route control for the first range of numbers of hops and does not perform the route control beyond the first range of numbers of hops from the data management device.

Embodiments of the present invention will be described below with reference to drawings.

First Embodiment

Figure 1:
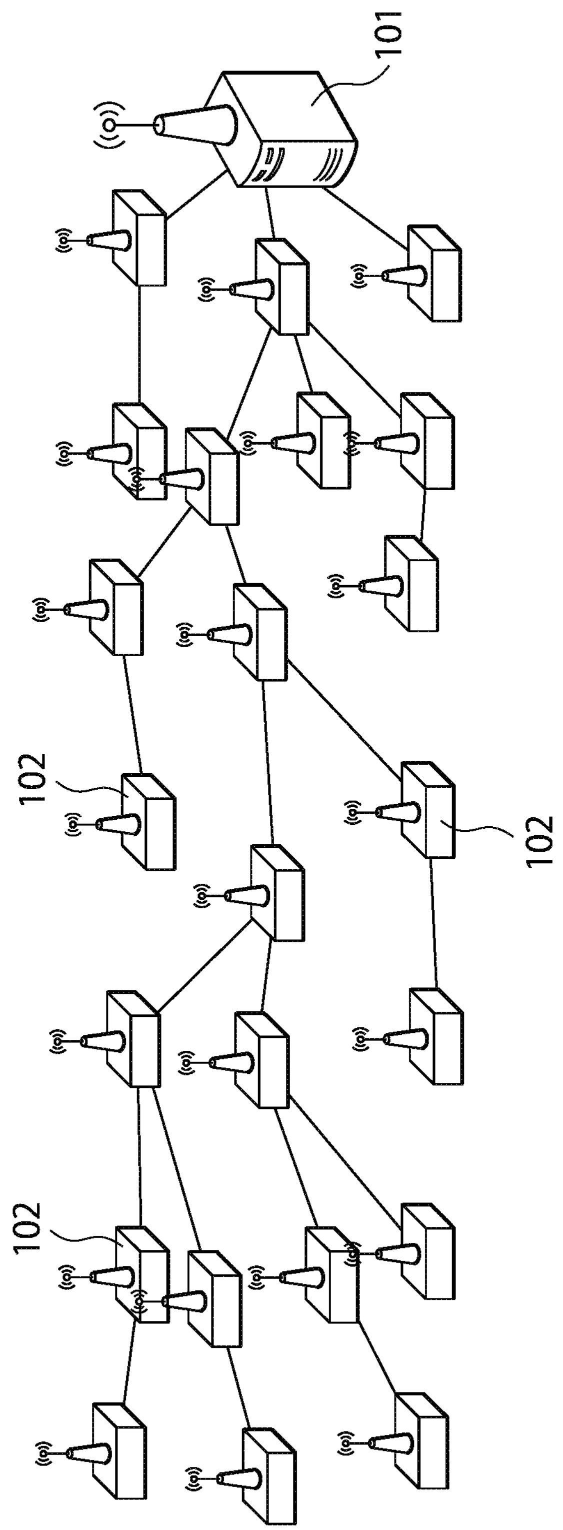
FIG. 1 is a diagram showing a configuration of a wireless communication system in a first embodiment.

FIG. 1 is a diagram showing a configuration of a wireless communication system according to a first embodiment. The present wireless communication system is a wireless multihop network provided with one concentrator 101 and a plurality of wireless nodes (hereinafter referred to as nodes) 102. Each of the wireless nodes 102 is mounted with a sensor. Each node 102 wirelessly transmits (relays) data including sensor information (for example, information about temperature or inclination) measured by the sensor and data received from lower nodes (child nodes) to an upper node. Thereby, pieces of sensor information acquired by the nodes 102 are collected to the concentrator 101. Each of the wireless nodes 102 is a wireless communication device that transmits data including the sensor information. The concentrator 101 is a data management device or a wireless communication device that manages the pieces of sensor information collected from the wireless nodes 102.

Figure 2:
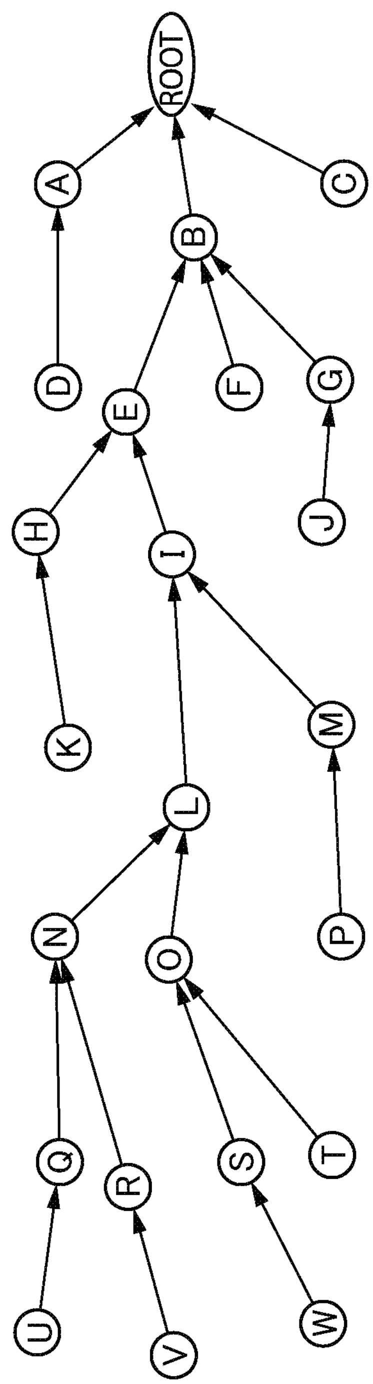
FIG. 2 is a network configuration diagram of the wireless communication system in the first embodiment.

FIG. 2 is a diagram in which the system configuration of FIG. 1 is shown in a form of a network topology. The concentrator 101 is referred to as a root node. The nodes 102 are expressed by circled alphabet letters. Nodes A, B and C directly communicate with the root node. Each of nodes D, E, F and G communicates with the root node via the node A or B. Thus, each node 102 communicates with the root node directly or via another node. Here, it is assumed that a side near to the root node (a side with a smaller number of hops) is an upstream side, and a side far from the root node (a side with a larger number of hops) is a downstream side. Each node receiving data from the downstream side (or the upstream side) and transmitting the received data to the upstream side (or the downstream side) is referred to as relay. A node that performs relay is referred to as a relay node. At the time of performing relay, the relay node may add data including sensor information measured by the relay node and the like to received downstream-side data to transmit the data. At the time of performing relay, a downstream-side node that performs transmission specifying the relay node as a transmission destination is referred to as a child node, and a node to be a destination to which the relay node transmits data is referred to as a parent node. A node that includes the relay node on its route to the concentrator 101 is referred to as a descendant node. A child node is an example of the descendant node. In the description below, a node with a smaller number of hops than the relay node may be an upper node, and a node with a larger number of hops than the relay node may be a lower node.

Figure 3:
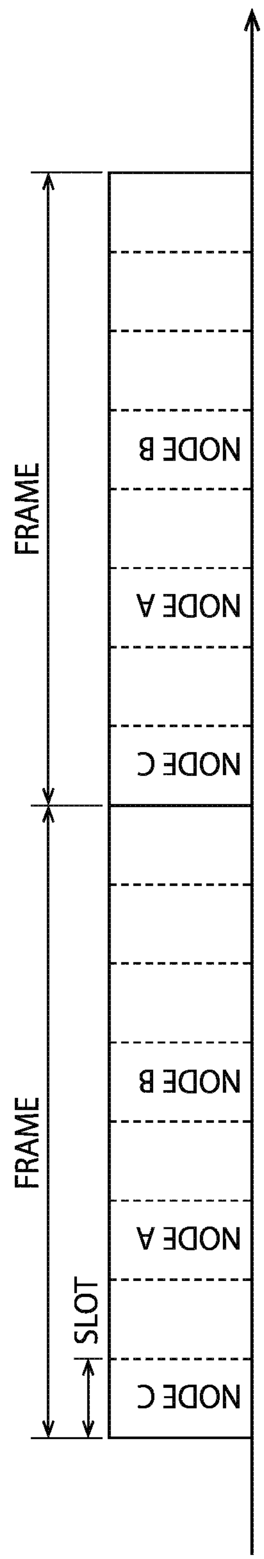
FIG. 3 is a diagram showing a relationship between a frame and slots in the first embodiment.

FIG. 3 is a diagram illustrating a communication scheme for the wireless multihop network according to the first embodiment. In this network, time division communication is used as the communication scheme. In the time division communication, time is divided into frames, and each frame is further subdivided into slots. Each node occupies a particular slot and transmits a radio signal in a frame period. Specifically, the transmitted radio signal is in a form of a packet. In the example of FIG. 3, the first slot in each frame is assigned to the node C. When transmitting a radio signal, the node C uses the first slot in each frame. Similarly, the node A transmits a radio signal in the third slot in each frame, and the node B transmits a radio signal in the fifth slot in each frame. An upper limit of a data size that each node can transmit in its slot depends on the width of the slot, a modulation scheme used for transmission and the like. If each node receives a data size exceeding the upper limit from a plurality of child nodes, there is a possibility that congestion occurs, for example, the node cannot relay a part of the data, or a part or all of the data is lost.

Figure 4:
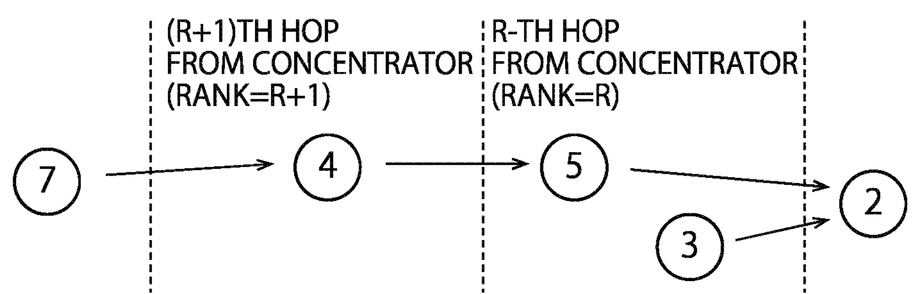
FIG. 4 is a diagram showing a network configuration in the first embodiment.

FIG. 4 is a diagram for illustrating the number of hops in the wireless multihop network. There are nodes 2, 3, 4, 5 and 7 on two routes leading to the concentrator 101 (not shown in FIG. 4) which is the root node. To the node 2, two nodes, that is, the nodes 3 and 5 are wirelessly connected (hereinafter referred to as "connected"). The node 4 is connected to the node 5, and the node 7 is connected to the node 4. Being connected means a state in which a connection process (an authentication process may be included) has been performed in advance, and mutual parameter exchange and the like have been completed. Connected nodes are in a relationship of a parent node and a child node. The nodes 3 and 5 are on the R-th hop from the concentrator 101, that is, the number of hops of the nodes 3 and 5 is R. The node 4 is on the (R+1)th hop from the concentrator 101, that is, the number of hops of the node 4 is R+1.

Figure 5:
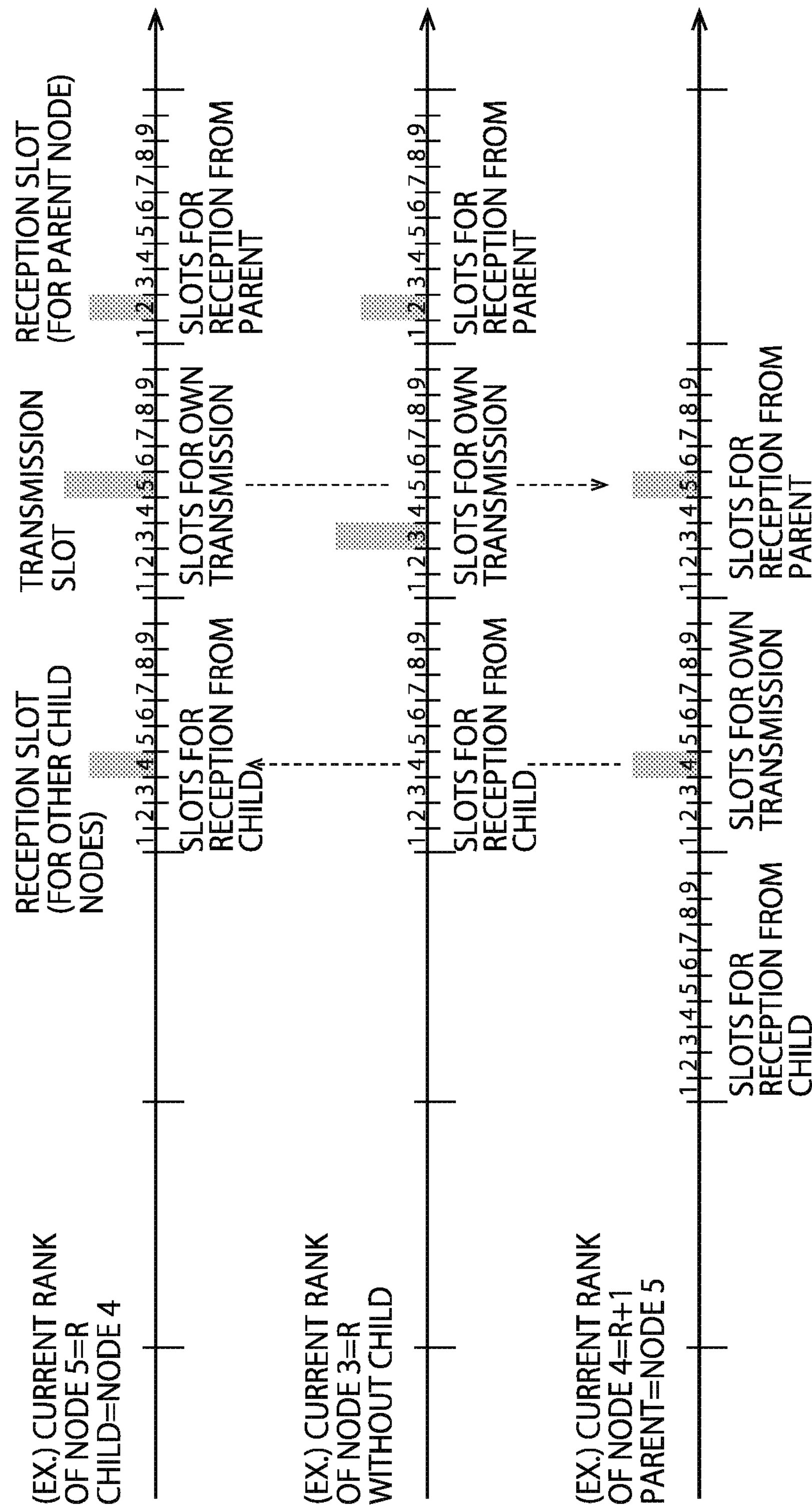
FIG. 5 is a diagram showing a method for using slots in the first embodiment.

FIG. 5 is an explanatory diagram of a basic operation of the wireless multihop network. The horizontal axis indicates time. To each node, a rank having the same value as the number of hops (the number of relays) from the root node is assigned. A collection of a predetermined number of adjacent slots is defined as a group of slots. A plurality of groups of slots are arranged in one frame. The first slot in a group of slots is given a slot number 1, and the next slot is given a slot number 2. Each slot in the group of slots is numbered similarly.

Each node performs transmission in a group of slots corresponding to the rank of the node. Here, a node with a higher rank (a node which is further from the root node) uses a temporarily earlier group of slots among a plurality of slot groups in a frame. For example, a node with a rank 1 the signal of which directly reaches the root node uses the temporarily last group of slots among the plurality of groups of slots in the frame. A node with a rank 2 which is communicable with the node with the rank 1 uses the second group of slots from the last, among the plurality of groups of slots in the frame. In the example shown in FIG. 4, the nodes 3 and 5 use the R-th group of slots from the last in a frame because the number of hops from the concentrator 101 is R. Thereby, a form of relaying data within one frame toward the root node on the upstream side from downstream-side nodes in such order that a downstream-side node further from the root node relays data earlier.

Each node uses a slot with a slot number that is the same number of the ID (node ID) of the node within a group of slots corresponding to the rank of the node. For example, the node 3 with a rank R uses a slot with a slot number 3 in the R-th group of slots from the last among a plurality of groups of slots in a frame (see the middle part of FIG. 5). Thereby, collision of radio signals transmitted by nodes does not happen unless there is duplication of IDs among the nodes.

A parent node performs a receiving operation at a transmission timing of a child node. For example, a transmission timing of the node 4, which is a child node of the node 5 and the rank of which is R+1, corresponds to the (R+1)th slot from the last with a slot number 4. Therefore, the node 5 performs an operation of reception from the node 4 in the (R+1)th slot from the last with the slot number 4 (see the upper and lower parts of FIG. 5).

A child node may perform an operation of receiving a radio signal transmitted by a parent node in order to confirm existence of the parent node. For example, by receiving a radio signal from the node 2 which is a parent node (see FIG. 4), the node 5 confirms that the node 2 exists (has not left the wireless multihop network). Since the rank of the node 2 is R−1, the node 5 performs the reception operation in a slot with the slot number 2 in the (R−1)th group of slots from the last. For power saving, each node sleeps during a period other than slots in which the node performs transmission or reception. As an example of a sleep operation, the node stops a part or all of operations of circuits (a processor, a communication circuit and the like) of the node. In the case of the node 5, slots used for transmission and reception by the node 5 are a slot for reception from child nodes, a slot for transmission by the node 5 and a slot for reception from the parent node (see the upper part of FIG. 5). The node 5 operates only in these three slots and sleeps in other slots.

Description has been made above on the case of transmission from the downstream side to the upstream side (referred to as uplink transmission), and transmission from the upstream side to the downstream side (referred to as downlink transmission) can be performed similarly. In the case of the downlink transmission, a frame can be subdivided into a plurality of groups of slots, and a slot can be assigned to each node similarly. Though a temporarily earlier slot is assigned to a node on a more downstream side in the uplink transmission, a temporarily earlier slot is assigned to a node on a more upstream side in the downlink transmission. In order to enable such assignment, different ranks are set for each group of slots, for uplink transmission and for downlink transmission. Specifically, though a higher rank is assigned to a temporarily earlier group of slots for uplink transmission, a lower rank is assigned to a temporarily earlier group of slots for downlink transmission. In the case of downlink transmission also, each node uses a slot with a slot number that is the same number of the ID (node ID) of the node within a group of slots corresponding to the rank of the node. Thereby, signal collision is suppressed even if the same frequency channel is used in uplink transmission and downlink transmission, and it is possible to perform uplink transmission and downlink transmission in parallel. Of course, it is possible to use different frequency channels for uplink transmission and downlink transmission.

Here, the operation of a child node receiving a radio signal transmitted from a parent node will be further described. For example, the node 4 receives a radio signal that the parent node 5 transmits to its parent node 2 in a slot for performing an operation of reception from the parent node 5. In addition to the data that the parent node 5 transmits to its parent node, a reception acknowledgement signal (ACK information) showing whether the parent node 5 has succeeded in receiving data that the node 4 has transmitted to the parent node 5 can be included in the radio signal. By confirming the ACK information, the node 4 can confirm whether transmission of the node 4 has succeeded or not. Further, by receiving a radio signal from the parent node 5, the node 4 can confirm existence of the parent node 5. Though description has been made on the node 4 as an example here, the same goes for the other nodes.

In the wireless multihop network, if there are a plurality of upper nodes (parent node candidates) as upper nodes that a certain node can communicate with, it is necessary to select a parent node from among the upper nodes. As a method for selecting a parent node, a scheme called ETX (Expected Transmission) is well known. The ETX scheme will be described below.

In the ETX scheme, a link cost and a path cost are used to select a parent node.

The link cost is defined as a cost required for communication from a certain node to a direct communication destination node (for example, a parent node). In the case of the ETX scheme, the link cost is an expected value of the number of transmissions required to send data to a communication partner node without an error (that is, an expected value of the number of transmissions required to succeed in data transmission). If data can be sent without an error by one transmission, the link cost is 1. If one or two resendings are required (if an expected value of the number of resendings is 1 or 2), the link cost is 2 or 3. As the expected value of the number of resendings, an average value of the number of resendings in the past or the like is used as an example.

The path cost is a cost required for communication from a certain node to a root node. In the ETX scheme, the path cost is an expected value of a total number of transmissions, that is, a total value of all link costs on a route leading to a root node. When the path cost is small, it means that the number of hops is small, or there are only few data errors on the route.

Figure 6:
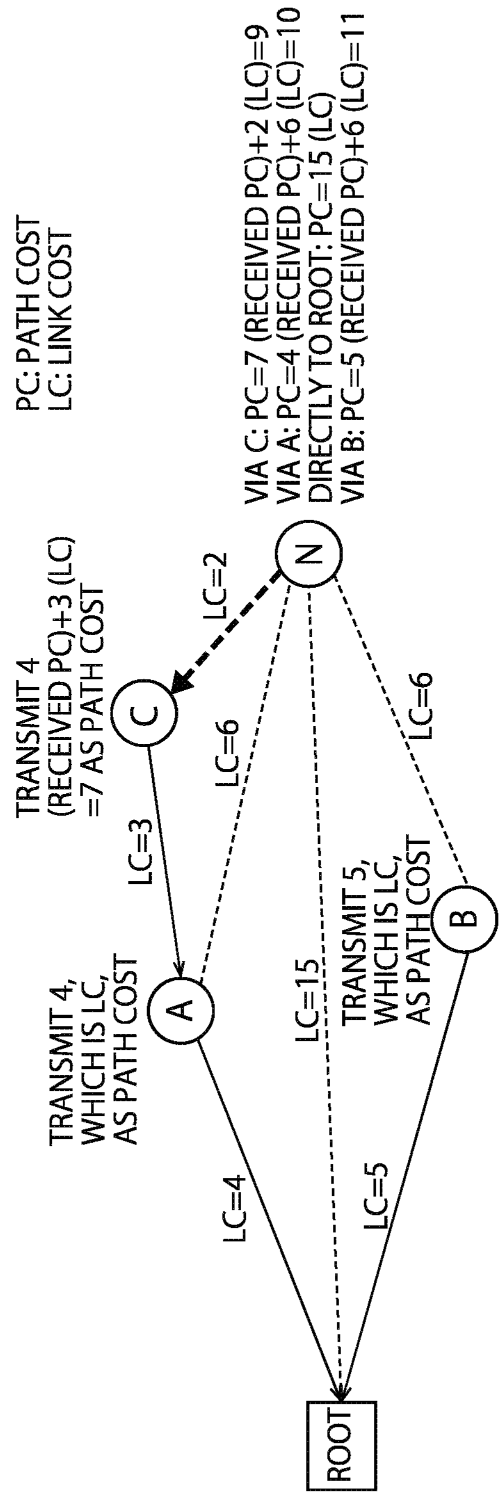
FIG. 6 is a diagram showing a parent node selection method in an EXT scheme.

FIG. 6 shows an example of calculation of link costs and path costs. A link cost (LC) from a node A to a root node is 4. This shows that, in addition to the first transmission, three resendings are required to transmit data from the node A to the root node as an expected value. Since the node A is directly connected to the root node, a path cost (PC) of the node A is 4 the same as the link cost.

A link cost from a node C to the node A is 3. A path cost from the node C to the root node via the node A is 7, the total of the path cost of the node A and the link cost of the node C. That is, for the route leading to the root node from the node C via the node A, an expected total number of transmissions is 7.

An example of selecting a parent node using path costs will be described for a node N. As candidates for a parent node of the node N, the node C, the node A, a node B and the root node exist. The node N calculates a path cost for each of four routes leading to the root node, the four routes including the node C, the node A, a node B and the root node, respectively. Then, a parent node candidate included in a route with the lowest path cost is determined as a parent node. A route with a low path cost can be said to be, in other words, a route through which data transmission can be performed with a stable communication quality. In the present example, the route with the lowest path cost is the route via the node C. The node N selects the node C as a parent node.

Each node transmits a radio signal including the path cost of the node in a slot for the node. Surrounding nodes can grasp path costs of the nodes by receiving the radio signal. For example, the node A transmits a path cost of 4. Here, "a path cost x" (x is a real number) means a path cost the value of which is x. By adding a link cost of 3 between the node A and the node C to the path cost of 4 received from the node A, the node C obtains a path cost of 7. The node C transmits the path cost of 7. By adding a link cost of 2 between the node N and the node C to the path cost of 7 received from the node C, the node N obtains a path cost of 9 for a route from the node N to the root node in the case of passing through the node C. The node N calculates path costs for the node A, the root node and the node B similarly and obtains 10, 15 and 11, respectively. Since the path cost in the case of passing through the node C is the lowest, the node C is selected as a parent node.

In the ETX scheme, there is a tendency that such a route that a link is stable, and the number of resendings is small is selected. As a result, data to be relayed concentrates to a node included in a stable route, and congestion easily occurs.

Figure 7:
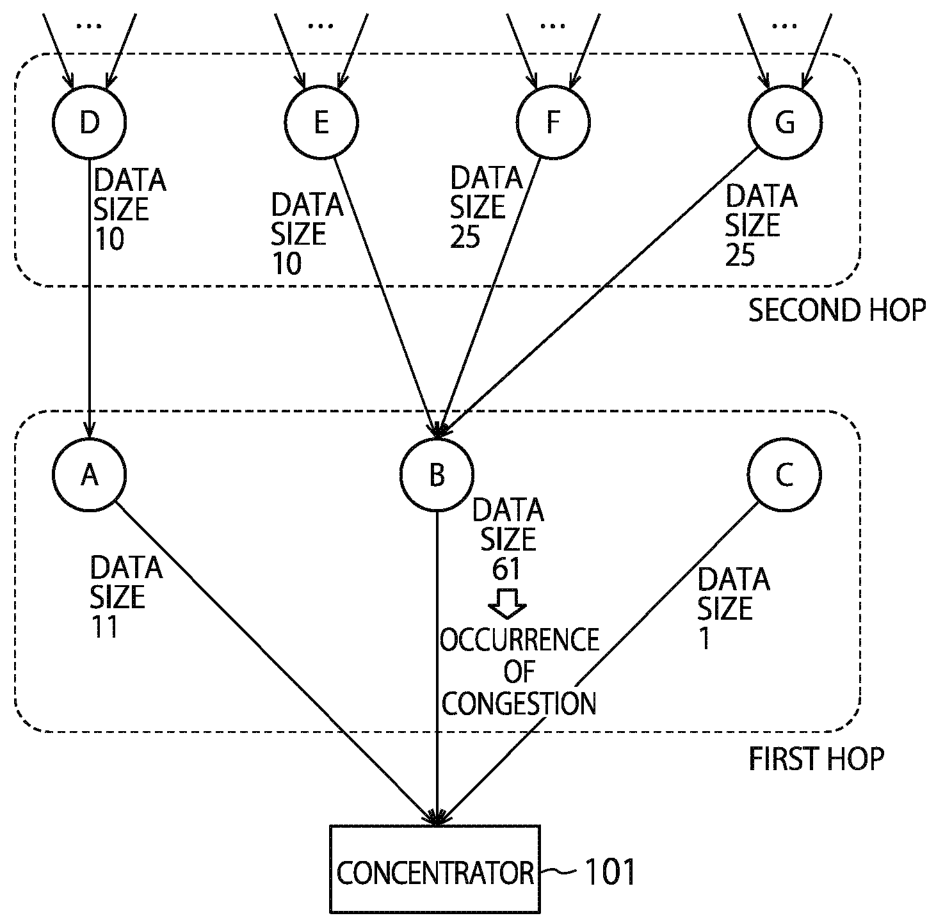
FIG. 7 is a diagram illustrating congestion in a wireless multihop network.

FIG. 7 is a diagram illustrating congestion in the wireless multihop network. Nodes A, B and C are nodes that directly communicate with the concentrator 101 (nodes having number of hops 1). Nodes having number of hops 2 are nodes D, E, F and G. The node D is a child node of the node A. The nodes E, F and G are child nodes of the node B. The node C does not have a child node. Each of the nodes D to G has child nodes (nodes having number of hops 3) though the child nodes are not shown. Each of the nodes in the present network generates and transmits data that includes sensor information of the node. The data transmitted from the nodes is collected to the concentrator 101 by being repeatedly relayed by one or more relay nodes. Hereinafter, for simplification of description, it is assumed that a size of data including sensor information generated by one node is 1.

In FIG. 7, the node D transmits data with a data size of 10 to the node A. More specifically, the node D collectively transmits data with a data size of 9 received from child nodes (for example, data from nine descendant nodes) and data of the node D to the node A in a slot assigned to the node D. The node A receives the data with the data size of 10 from the node D, adds data of the node A with a data size of 1 to the received data and transmits data with a data size of 11 in total to the concentrator 101 in a slot assigned to the node A. Actually, at the time of performing relay, data received from child nodes and data generated by a node itself are integrated in one packet and transmitted. Therefore, a data size to be transmitted data is not necessarily the total of a data size received from the child nodes and the data generated by the node itself. Here, for simplification of description, the difference is ignored.

Similarly, the nodes E, F and G transmit data with a data size of 10, data with a data size of 25 and data with a data size of 25, respectively, to the node B. A data size that the node B has to transmit in a slot for the node B is 61 (=10+25+25+1), the total of the data sizes received from the node E, F, and G and a data size of the node B. If the upper limit of a data size that the node B can transmit is 30, data corresponding to a data size of 31 of the data size of 61 exceeding the data size of 30 cannot be transmitted. Then, there is a possibility that a part or all of the data corresponding to the data size of 31 is lost.

As described above, in the method of selecting a parent node based on communication qualities or the like, there may be a case where concentration of data occurs, and there is a possibility that data overflows. That is, there may be a case where data concentrates to a particular node, and the data size of the data exceeds the upper limit of a data size that the particular node can transmit. In this case, there is a possibility that data corresponding to a data size above the upper limit is not transmitted or lost. Such data concentration, that is, congestion occurs more easily especially in a node closer to the concentrator 101 (in a node with a smaller number of hops). In the embodiment of the present invention, such data concentration (congestion) is suppressed so that data can reach the concentrator 101 without overflowing.

An outline of an operation related to route control according to the present embodiment will be described with reference to FIGS. 8 to 11.

Figure 8:
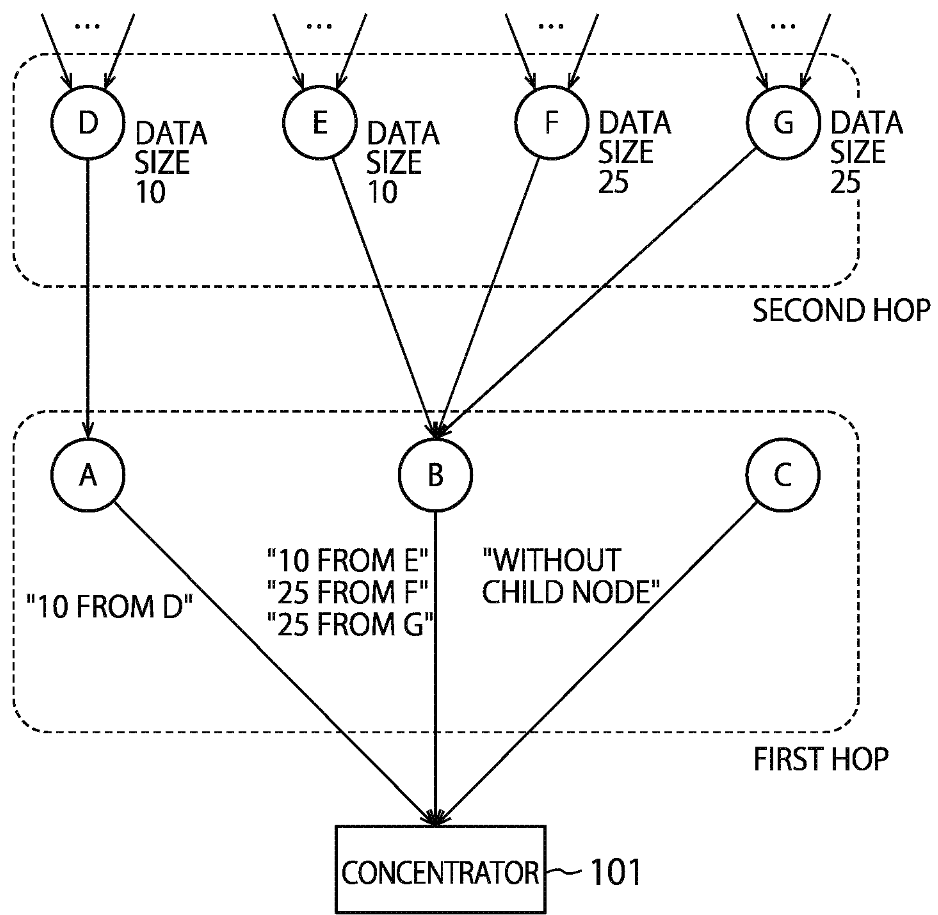
FIG. 8 is a diagram for illustrating an operation example according to the first embodiment.

FIG. 8 is a diagram showing a first step of the operation related to the route control according to the present invention. Since a network configuration in FIG. 8 is the same as the network configuration in FIG. 7, description will be omitted. It is necessary that the nodes D, E, F and G, which are the second hop nodes (nodes having number of hops 2) transmit pieces of data with the data sizes of 10, 10, 25 and 25, respectively. Each of the nodes D to G transmits information on a required transmission data size (first information), which is a data size required to be transmitted, to the node A or B which is a parent node (having number of hops 1). Since each of the nodes D, E, F and G generally transmits the same size of data in a frame period as far as a new child node connects to the node, the required transmission data size can be calculated. The node A receives the information on the required transmission data size from the node D, and the node B receives the required transmission data sizes from the nodes E, F and G.

The nodes A and B transmit the information on the required transmission data sizes of the child nodes, respectively, to the concentrator 101. Specifically, the node A transmits information on a required transmission data size of 10 for the node D (indicated by “10 from D” in FIG. 8) to the concentrator 101. The node B transmits information on a required transmission data size of 10 for the node E (indicated by “10 from E” in FIG. 8), information on a required transmission data size of 25 for the node F (indicated by “25 from F” in FIG. 8) and information on a required transmission data size of 25 for the node G (indicated by “25 from G” in FIG. 8) to the concentrator 101. Since the node C does not have a child node, the node C transmits information to the effect that the node C does not have a child node (“without child node”) to the concentrator 101.

The notification of the information on the required transmission data sizes from the nodes having number of hops 2 (the nodes D to G) and the reports from the nodes having number of hops 1 (the nodes A, B and C) to the concentrator 101 are transmitted at timings determined beforehand or at arbitrary timings. For example, the notification of the required transmission data sizes and the report to the concentrator 101 may be transmitted at regular intervals. Each time data transmission in each frame period from each of the nodes D to G to the node A or B is performed, the information on the required transmission data size may be transmitted in the same packet. Each time data transmission in each frame period from each of the nodes A to C to the concentrator 101 is performed, the information on the required transmission data size of each child node or the information of not having a child node may be transmitted in the same packet.

FIG. 9 is a diagram showing a second step of the operation related to the route control according to the present invention. The information transmitted to the concentrator 101 from the nodes having number of hops 1 are shown on the left of FIG. 9. Based on the information, the concentrator 101 identifies the required transmission data sizes of the nodes D to G having number of hops 2. The concentrator 101 calculates about whether each of the nodes having number of hops 1 can completely transmit (relay) all the data received from the child node(s) (node(s) having number of hops 2) of the node in a slot assigned to the node having number of hops 1. That is, the required transmission data size of each of the nodes having number of hops 1 exceeds an upper limit. It is assumed that the upper limit of a data size each node can transmit in one slot is 30. It is also assumed that the size of data to be generated by each node is 1.

For example, as for the node A, the concentrator 101 calculates the required transmission data size of the node A as 11, the sum total of 10 which is the required transmission data size of the node D and 1 which is the size of data to be generated by the node A. The required transmission data size of the node C is calculated as 1. As for the node B, the concentrator 101 calculates the required transmission data size of the node B as 61 obtained by adding 60, the sum total of the required transmission data sizes of the node E, F, and G and 1 which is the size of data to be generated by the node B.

Since the required transmission data sizes of the nodes A and C are below the upper limit of 30 from the above calculation results, the concentrator 101 judges that the nodes A and C can transmit the data without overflowing. However, since the required transmission data size 61 of the node B exceeds the upper limit of 30, the concentrator 101 judges that the node B cannot transmit a part of the data. Therefore, the concentrator 101 judges that a node the required transmission data size of which exceeds the upper limit exists among the nodes having number of hops 1.

In this case, the concentrator 101 reviews the current connections from the nodes having number of hops 2 to the nodes having number of hops 1 and determines, at least for one of the nodes having number of hops 2, a new connection destination (a parent node) based on a result of the review. For example, the concentrator 101 determines that the connection destination of the node E is switched from the node B to the node A, and the connection destination of the node G is switched from the node B to the node C. A result of the determination is shown on the right of FIG. 9. According to the determination result, for all of the nodes A, B and C having number of hops 1, the required transmission data size is below 30. Therefore, any of the nodes A, B and C can transmit the data to the concentrator 101 without overflowing.

The process related to the route control (review of parent nodes) by the concentrator 101 may be performed each time the concentrator 101 receives reports of the required transmission data sizes of the child nodes from the nodes having number of hops 1 or each time the concentrator 101 receives the reports a predetermined number of times. The process may be performed when data (sensor information) from at least any node in the network has not been received. In the above example, since it seems that overflow occurs in communication from the node B to the concentrator 101, the process may be performed when the concentrator 101 fails in reception of sensor information of at least any one node among the node B and descendant nodes of the node B.

Figure 10:
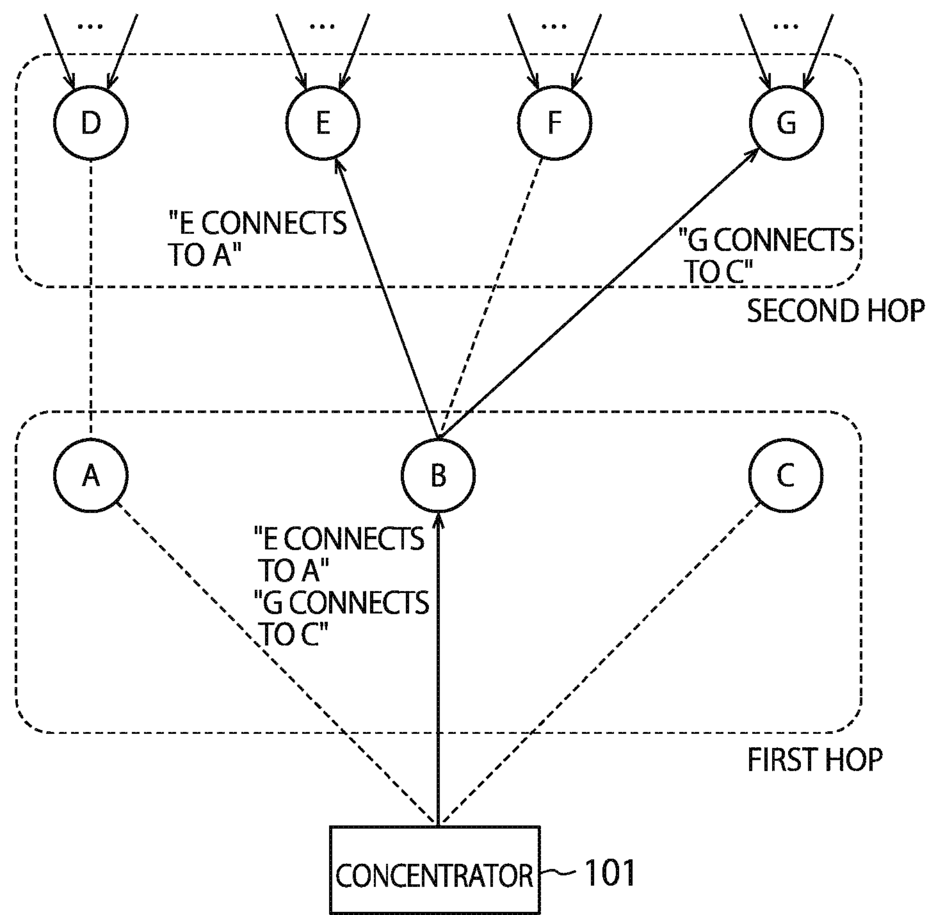
FIG. 10 is a diagram continued from FIG. 9.

FIG. 10 is a diagram showing a third step of the operation related to the route control according to the present invention. The concentrator 101 which has reviewed the connection destinations of the nodes having number of hops 2 (redetermination of parent nodes) transmits information specifying a destination (a new parent node) to which a node having number of hops 2 should newly connect, to a node having number of hops 1. In the present example, the connection destination of the node E is switched to the node A, and the connection destination of the node G is switched to the node C. Therefore, the concentrator 101 transmits switching instruction information (second information) specifying switching of the connections destinations, to the node B to which the nodes E and G are currently connected. For the transmission of the switching instruction information, a slot for uplink transmission assigned to the concentrator 101 can be used. Receiving the switching instruction information, the node B transmits switching instruction information instructing the node E to switch the connection destination to the node A, to the node E, and transmits switching instruction information instructing the node G to switch the connection destination to the node C, to the node G. For the transmission of the pieces of switching instruction information, the slot for uplink transmission assigned to the node B can be used.

Figure 11:
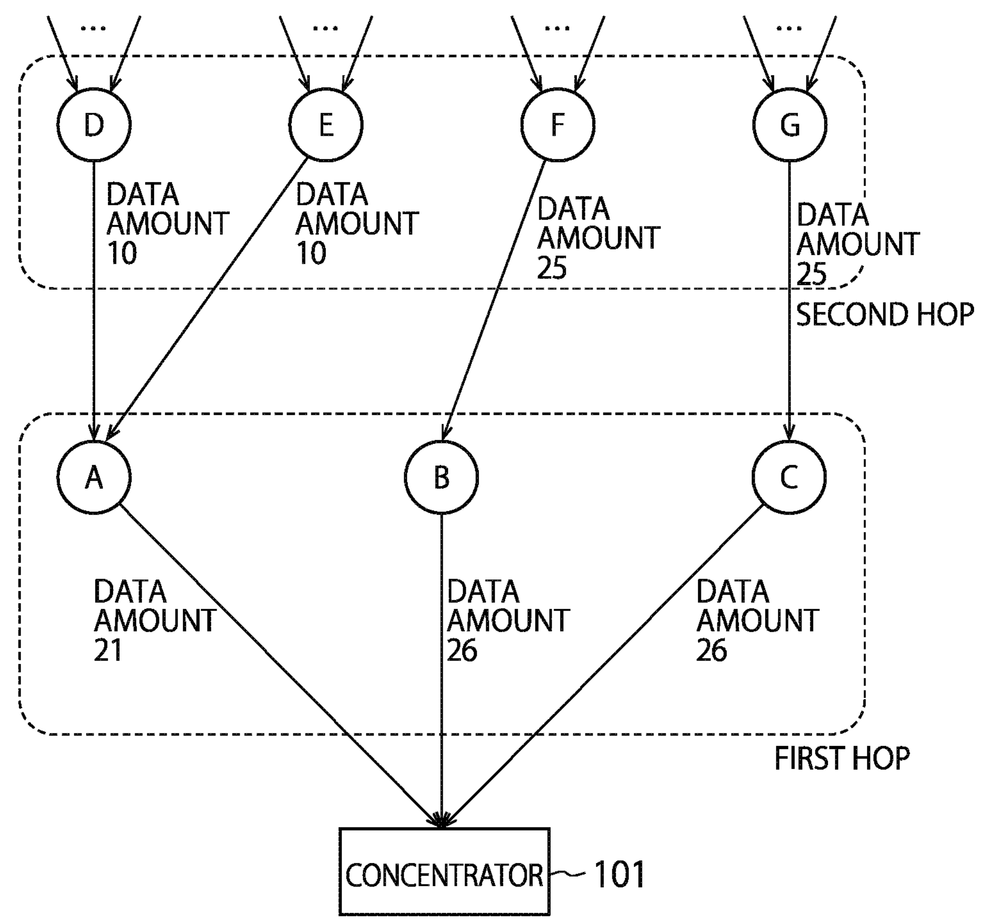
FIG. 11 is a diagram continued from FIG. 10.

FIG. 11 is a diagram showing a fourth step of the operation related to the route control according to the present invention. Receiving the pieces of switching instruction information from the node B, the nodes E and G switch the connection destinations to the nodes A and C, respectively, according to the instructions. By this switching, the node A newly has to relay data from the node E in addition to data from the node D, and the node C newly has to relay data from the node G. Even in that case, the required transmission data size of the node A is 21 including the data size 1 of data to be generated by the node A, and the required transmission data size of the node C is 26 including the data size 1 of data to be generated by the node C. Both of the required transmission data sizes are below the upper limit of 30. Therefore, both of the nodes A and C can transmit all of data to be relayed, which has been received from their child nodes, and data to be generated by the nodes A and C in slots for the nodes A and C, respectively. As for the node B, since its child node is only the node F, the required transmission data size of the node B is 26 including the data size 1 of data to be generated by the node B. Since the required transmission data size is below the upper limit of 30, the node B also can transmit all of data received from its child node and data generated by the node B in the slot for the node B without occurrence of data overflow (congestion).

Though the operation of the route control described above is performed for the nodes having number of hops 2, the operation may be performed for nodes having number of hops 3 or more. However, it is assumed that the route control is performed for a range where the number of hops from the concentrator 101 is up to N (N is an integer equal to or larger than 2) and is not performed for a range where the number of hops exceeds N. Here, N is a value smaller than the maximum number of hops in the network. By restricting the range for which the route control is performed to a range close to the concentrator 101 as described above, communication for control with a node that cannot be communicated with without multi-stage relay becomes unnecessary, and efficient control becomes possible. Actually, it is a node close to the concentrator 101 that a lot of data concentrates. Therefore, in this sense also, efficient control becomes possible by targeting nodes in the range close to the concentrator 101.

Description will be made below on configurations and operations of a wireless node and a concentrator realizing an operation related to route control as described above.

Figure 12:
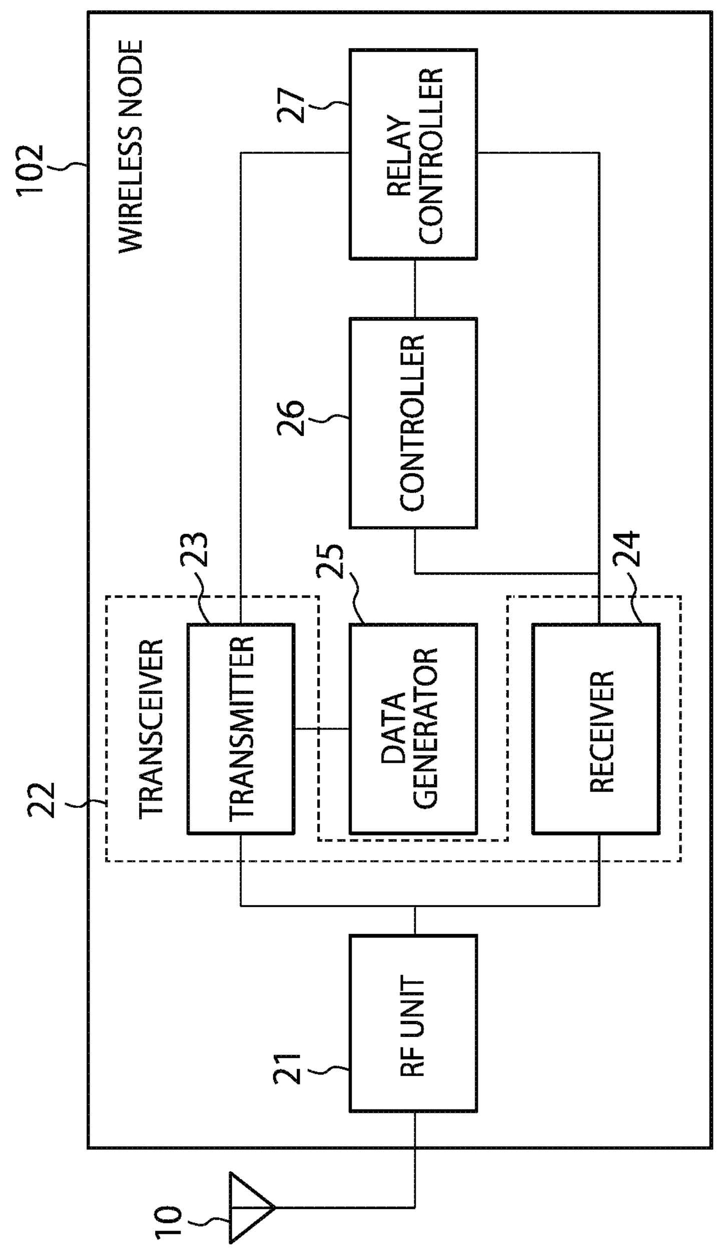
FIG. 12 is a block diagram showing a configuration of a wireless node according to the first embodiment.

FIG. 12 is a diagram showing a configuration of the wireless node (a wireless communication device) 102 in the present embodiment. The wireless communication device 102 is provided with an antenna 10, an RF unit 21, a transceiver 22, a data generator 25, a controller 26 and a relay controller 27. Each of these components can be configured with a processor or a circuit, such as a CPU. Each of the components may be provided with a buffer such as a memory. The memory may be a volatile memory such as a DRAM or an SRAM or a nonvolatile memory such as a NAND, an FRAM or an MRAM. The device may be provided with a storage device such as a hard disk device and an SSD. The controlling circuitry according to an embodiment includes the controller 26 and/or the relay controller 27 as one example.

The antenna 10 performs transmission and reception of a radio frequency signal (a radio signal). There may be one antenna 10 or a plurality of antennas 10. The antenna 10 may be an array antenna.

The RF unit 21 is connected to the antenna 10. The RF unit 21 performs a process for converting a bit sequence of a packet for transmission to a radio signal and transmitting the radio signal. The RF unit 21 performs a process for extracting a bit sequence of a packet from a received radio signal.

Figure 13:
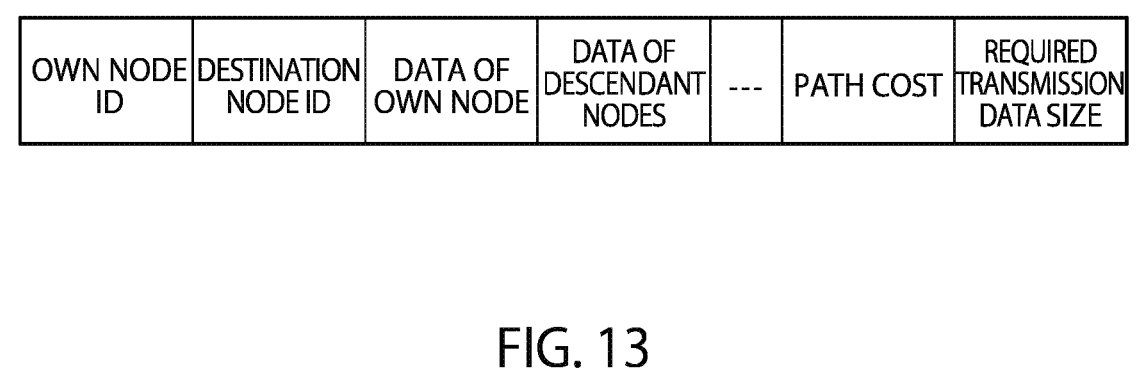

FIG. 13 shows an example of a format of a packet. A packet includes a plurality of fields for storing an own node ID, a destination node ID, data of the own node, data of descendant nodes (data to be relayed), a path cost and information about a data size (a required transmission data size) to be transmitted by the own node. A configuration is also possible in which the information on a required transmission data size is transmitted in a packet different from the packet including the data of descendant nodes. A field for information identifying nodes having number of hops N−1 with which the own node having number of hops N can communicate may be provided. For example, when the number of hops of the own node is 2, information identifying nodes having number of hops 1 with which the own node can communicate is stored in this field. A field for the number of descendants for setting the number of descendant nodes of the own node may be provided. An ACK field for acknowledgement at the time of receiving data of a child node and descendant nodes from the child node may be provided.

The data generator 25 generates data for its own node. The data generator 25 is connected to a sensor. The sensor measures temperature, an inclination or the like. The data generator 25 acquires a measured value from the sensor and generates data that includes sensor information obtained by bit conversion of the measured value. Though the data for the node is generated from the sensor here, generation of the data is not limited thereto. For example, the data may be generated based on a result of operation performed by a CPU or a value indicating an internal state of the node.

The transceiver 22 is provided with a transmitter 23 and a receiver 24.

The transmitter 23 generates a packet based on data and parameters provided from at least one of the data generator 25 and the relay controller 27 and sends out a transmission bit sequence of the packet to the RF unit 21. The data here is data generated by the data generator 25 (sensor information and the like) and data to be relayed (data received from child nodes). The generated data is stored into the own node data field, and the data to be relayed is stored into the descendant node data field. The parameters are an ID of a transmission-destination parent node, a transmission timing (for example, which slot in which frame), a transmission power value and the like. The ID of the transmission-destination parent node is stored into the destination node ID field. The ID of the own node is stored into the own node ID field. The path cost of the own node is stored into the path cost field. In the case of providing the ACK field in a packet, for example, if data of a child node and descendant nodes is received from the child node, a bit of a corresponding node in the ACK field is set to 1. If the data is not received, the bit is set to 0. The parameters are provided to the transmitter 23 from the data generator 25 or the relay controller 27. The parameters may be set in the buffer in the transmitter 23 beforehand.

The receiver 24 extracts data and parameters from a bit sequence of a packet received from the RF unit 21. The extracted data and parameters are sent to the controller 26 and the relay controller 27. The parameters here are, a transmission source ID of a received radio signal, reception power and a reception timing at the time of having received the radio signal. Acknowledgement (ACK) to a radio signal that the own node transmitted may be included.

The controller 26 selects a parent node from among parent node candidates and performs a process for connecting to the selected parent node. The parent node candidates are, for example, nodes that can transmit or receive a radio signal to or from the own node. As an example, the controller 26 selects a parent node based on path costs of a plurality of routes leading to a root node and including the parent node candidates, respectively. Information about the selected parent node is sent to the relay controller 27. For example, a link costs between the own node and each parent node candidate which is necessary for the calculation of path costs may be acquired by calculating an expected value of the number of transmissions performed before being successful in transmission if there is a past transmission history. The number of transmissions performed before being successful in transmission may be measured by actually performing communication with each parent node candidate. A link cost between the own node and a node may be calculated based on a reception power value of a radio signal received from the node. For example, as the reception power value is larger, a link cost with a smaller value is calculated. The controller 26 sets the calculated link cost as a link cost between the own node and the transmission source node of the radio signal.

When receiving a request to acquire information on a required transmission data size from the concentrator 101, the controller 26 calculates the required transmission data size and transmits information on the required transmission data size to the concentrator 101 via the parent node. The controller 26 may detect the number of hops of its own node and perform the operation only when the detected number of hops is a predetermined value (for example, 2). In the information on the required transmission data size, information about wireless nodes upper by one hop (having number of hops N−1) with which the own node (having number of hops N) can communicate may be included. The required transmission data size can be calculated, for example, by adding up sizes of pieces of sensor information (pieces of sensor information from different downstream wireless nodes) received within a past predetermined period (for example, a period of one frame).

If receiving switching instruction information from the parent node, the controller 26 performs a process for switching the connection destination to a parent node specified by the switching instruction information.

The controller 26 may judge whether the number of hops of its own node is a predetermined value or within a predetermined range and, if the number of hops is the predetermined value or within the predetermined range, voluntarily perform a process for calculating the required transmission data size of its own node and judging whether the required transmission data size has exceeded the upper limit or not. For example, if the range of the route control is two hops, and the number of hops of the own node is one (corresponding to the predetermined value), the controller 26 performs the process. If the range of the route control is N hops, and the number of hops of the own node is between 1 and N−1 including 1 and N−1 (within the predetermined range), the controller 26 performs the process. The predetermined value and the predetermined range are determined based on the range of the route control of the concentrator 101. If the required transmission data size exceeds the upper limit, information showing that the upper limit has been exceeded is transmitted to the concentrator 101 via the parent node or directly (in the case of the own node being connected to the concentrator 101). The concentrator 101 may start the process related to the route control (see FIGS. 8 to 11), being triggered by reception of this information.

The relay controller 27 receives data of child nodes received by the receiver 24 and sends out the data to the transmitter 23 for relay. The relay controller 27 also performs determination of a transmission timing and the like.

Figure 14:
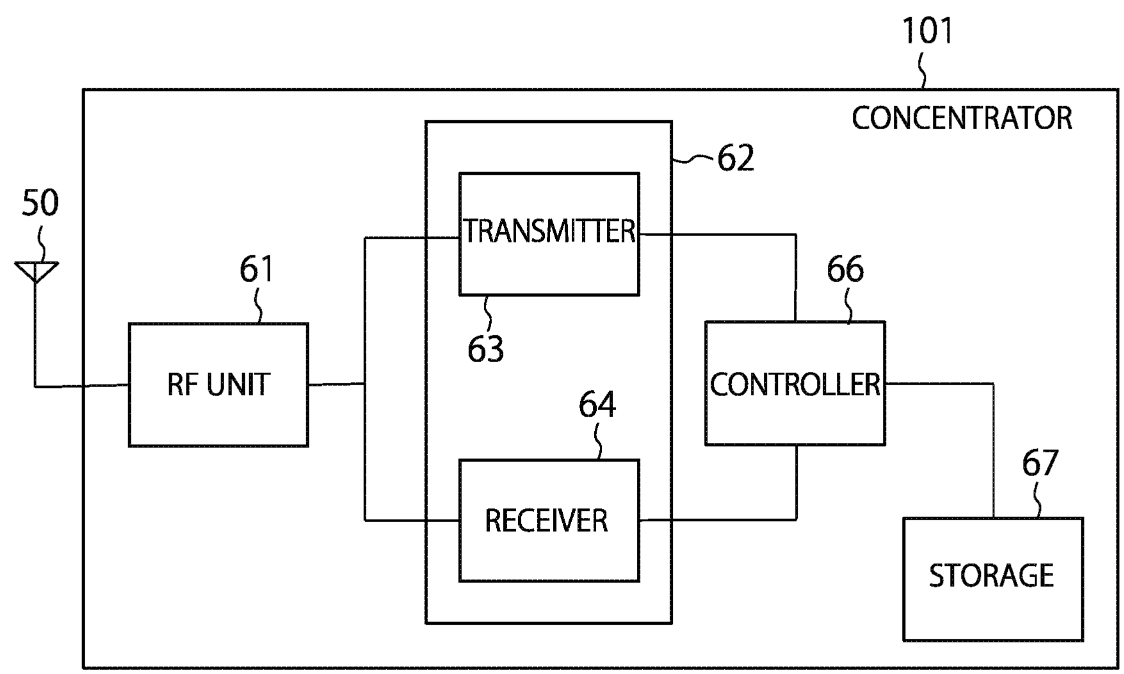
FIG. 14 is a block diagram showing a configuration of a concentrator according to the first embodiment.

FIG. 14 is a diagram showing a configuration of the concentrator 101 in the present embodiment. The concentrator 101 is provided with an antenna 50, an RF unit 61, a transceiver 62, a controller 66 and a storage 67. Each of these components can be configured with a processor or a circuit, such as a CPU. Each of the components may be provided with a buffer such as a memory. The storage 67 may be a memory or a storage device such as a hard disk device or an SSD. The memory may be a volatile memory such as a DRAM or an SRAM or a nonvolatile memory such as a NAND, an FRAM or an MRAM. The controlling circuitry according to an embodiment includes the controller 66 as one embodiment.

The antenna 50 performs transmission and reception of a radio frequency signal (a radio signal). There may be one antenna 50 or a plurality of antennas 50. The antenna 50 may be an array antenna.

The RF unit 61 is connected to the antenna 50. The RF unit 61 performs a process for converting a bit sequence of a packet for transmission to a radio signal and transmitting the radio signal. The RF unit 61 performs a process for extracting a bit sequence of a packet from a received radio signal. The format of a packet transmitted from the concentrator 101 may be arbitrary. As an example, the format of a packet includes a plurality of fields for storing an own node ID, a destination node ID and information for transmission (switching instruction information or the like).

The transceiver 62 is provided with a transmitter 63 and a receiver 64.

The transmitter 23 generates a packet based on information and parameters provided from the controller 66 and sends out a transmission bit sequence of the packet to the RF unit 61. Information included in the packet is information including, for example, an instruction to a wireless node.

The parameters are an ID of a transmission-destination parent node, a transmission timing (for example, which slot in which frame), a transmission power value and the like.

The receiver 64 extracts data and parameters from a bit sequence of a packet received from the RF unit 61. The extracted data and parameters are sent to the controller 66. The parameters here are, a transmission source ID of a received radio signal, reception power and a reception timing at the time of having received the radio signal. Acknowledgement (ACK) to a radio signal that the own node transmitted may be included.

The controller 66 stores the data (for example, sensor information) obtained by the receiver 64 into the storage 67. The controller 66 grasps wireless nodes participating in the wireless multi-hop network. The controller 66 also grasps an upper limit of a data size that each of the wireless nodes participating in the wireless multihop network can transmit. The upper limit may be determined by the system in advance, or information about the upper limit may be acquired from each of the wireless nodes via communication.

The controller 66 determines a range of numbers of hops for execution of the route control (the control for determining a parent node) in the wireless multihop network based on the number of hops (N) from the concentrator 101. N is an integer equal to or larger than 2. The controller 66 performs the route control for a range (first range) from the concentrator 101 up to the number of hops N and does not perform the route control for a range (second range) beyond first the range. The second range is a range where the number of hops is larger than the number of hops N. As an example, it is assumed that the number of hops N for the range for execution of the route control is 2. In this case, the route control is performed for a range up to the number of hops of 2. Since nodes having number of hops 1 are connected to the concentrator 101, and their routes are fixed, nodes having number of hops 2 are targeted for the route control (the control for determining a parent node). If the number of hops N is 3, either nodes having number of hops 3 or nodes having number of hops 2, or both of the nodes having number of hops 3 and the nodes having number of hops 2 are targeted for the route control. FIGS. 8 to 11 described above correspond to an example of a case where the range targeted for the route control is up to the number of hops of 2. The number of hops N for a range (first range) targeted for the route control is smaller than the maximum number of hops from the concentrator 101 in the network. The number of hops N for the route control may be determined according to the maximum number of hops. For example, the number of hops N for the route control may be determined by multiplying the maximum number of hops by a predetermined coefficient. The number of hops N for the route control may be fixed to a predetermined value (for example, 2). Though the range of the number of hops is up to the number of hops of 2 in the description below, the route control can be implemented similarly even if the range of the number of hops is up to 3.

If reception of sensor information of any wireless node fails, for example, if sensor information of a certain wireless node has not been received for a predetermined period, the controller 26 may start the route control process. In the route control process, it is necessary to acquire information on the required transmission data sizes of the Nth-hop (in the present example, the second-hop) wireless nodes. Therefore, a request to transmit the information on the required transmission data size may be transmitted to each of the wireless nodes having number of hops 2 via a parent node of the wireless node to acquire the information on the required transmission data size.

The information may include communicable node information (third information) identifying nodes having number of hops 1 with which the node having number of hops 2 can communicate (parent node candidates). Based on the acquired information on the required transmission data size, it is judged whether the parent node switching process is necessary for the node having number of hops 2. Specifically, the controller 66 calculates the required transmission data sizes of the nodes having number of hops 1 based on the acquired information and judges whether there is a node having number of hops 1, the required transmission data size of which exceeds the upper limit. If there is a node having number of hops 1, the required transmission data size of which exceeds the upper limit, the controller 66 judges that the parent node switching process is necessary for a child node of the node having number of hops 1, the required transmission data size of which exceeds the upper limit. In this case, a node having number of hops 2 the connection destination of which is to be switched, and a switching-destination parent node are selected as described with reference to FIGS. 8 to 11, and switching instruction information instructing the selected node having number of hops 2 to switch to the selected parent node is generated. At the time of selecting the switching-destination parent node, nodes with which the node having number of hops 2 can communicate may be identified using the communicable node information described above. The generated switching instruction information is transmitted to the determined node via the current parent node having number of hops 1.

The controller 26 may start the parent node switching process when receiving information that the required transmission data size has exceeded the upper limit from the (N−1)th hop (in the present example, the first hop) node. In this case, a request to acquire information on a required transmission data size may be transmitted to each of child nodes (nodes having number of hops 2) of the node the required transmission data size has exceeded the upper limit via the node to receive the information on the required transmission data size. After that, a node the connection destination of which is to be switched is determined from among the child nodes, and switching instruction information instructing the determined node to switch the connection destination is generated. The generated switching instruction information is transmitted to the determined node via the parent node having number of hops 1.

Figure 15:
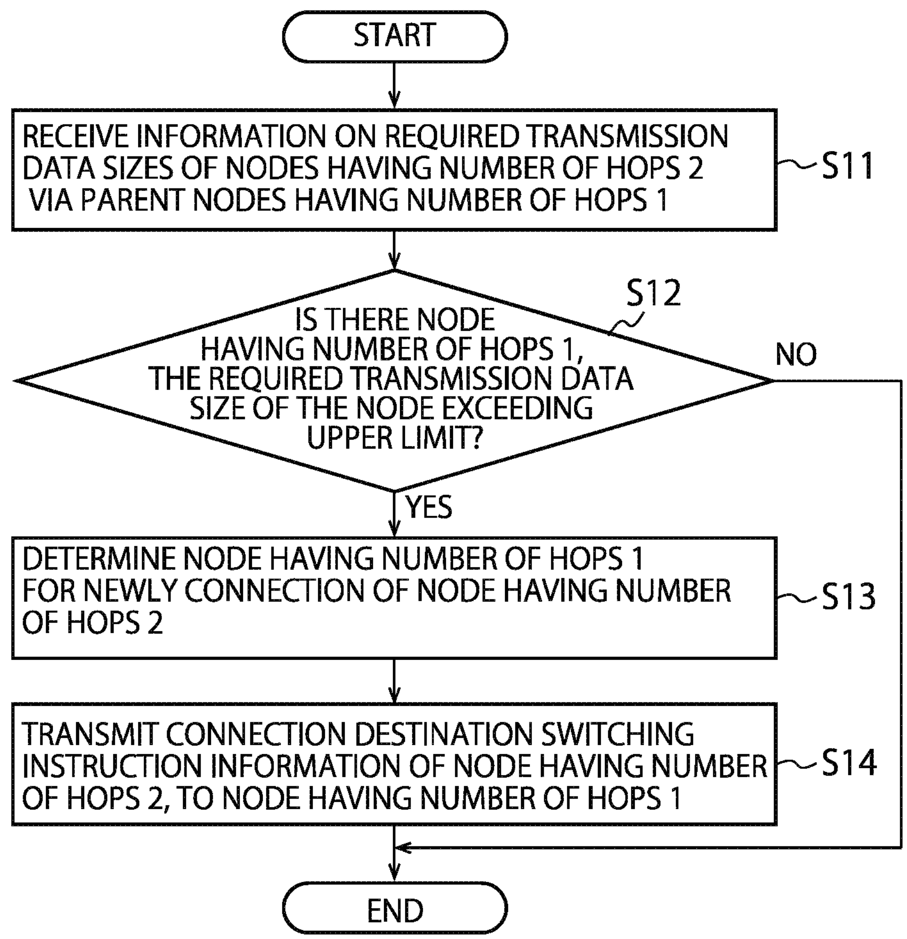
FIG. 15 is a flowchart of an operation example of the concentrator according to the first embodiment.

FIG. 15 is a flowchart of an operation example of the concentrator 101 according to the present embodiment.

At step S11, the concentrator 101 receives, via the nodes having number of hops 1, information on the required transmission data sizes of the nodes having number of hops 2, which are child nodes of the nodes having number of hops 1.

At step S12, the concentrator 101 calculates the required transmission data sizes of the nodes having number of hops 1, based on the received information. The required transmission data size of each of the nodes having number of hops 1 is the sum total of the required transmission data sizes of child nodes of the node and a data size generated by the node having number of hops 1. The concentrator 101 judges whether there is a node the required transmission data size of which exceeds the upper limit among the nodes having number of hops 1. That is, it is judged whether there is a node that cannot send all of data corresponding to a required transmission data size in an assigned slot. The node having number of hops 1, the required transmission data size of which exceeds the upper limit, is called a congestion node, and the other nodes having number of hops 1 are called non-congestion nodes.

If the concentrator 101 judges that there is not a congestion node, that is, each of all the nodes having number of hops 1 can send all of data corresponding to its required transmission data size (NO), the concentrator 101 ends the operation. On the other hand, if judging that there is at least one congestion node (YES), the concentrator 101 performs selection of a child node to be targeted by connection destination switching from among child nodes connected to the congestion node and selection of a parents node (a non-congestion node) to be a switching destination of the selected child node, under a condition that the required transmission data sizes of all the nodes having number of hops 1 become equal to or below the upper limit (S13).

At step S14, the concentrator 101 transmits switching instruction information to switch the connection destination of the selected child node (a node having number of hops 2) to the node having number of hops 1, which is the congestion node. The switching instruction node includes information specifying the node targeted by connection destination switching among the nodes having number of hops 2 connected to the congestion node (the child nodes), and a node having number of hops 1 to which the node should newly connect.

Figure 16:
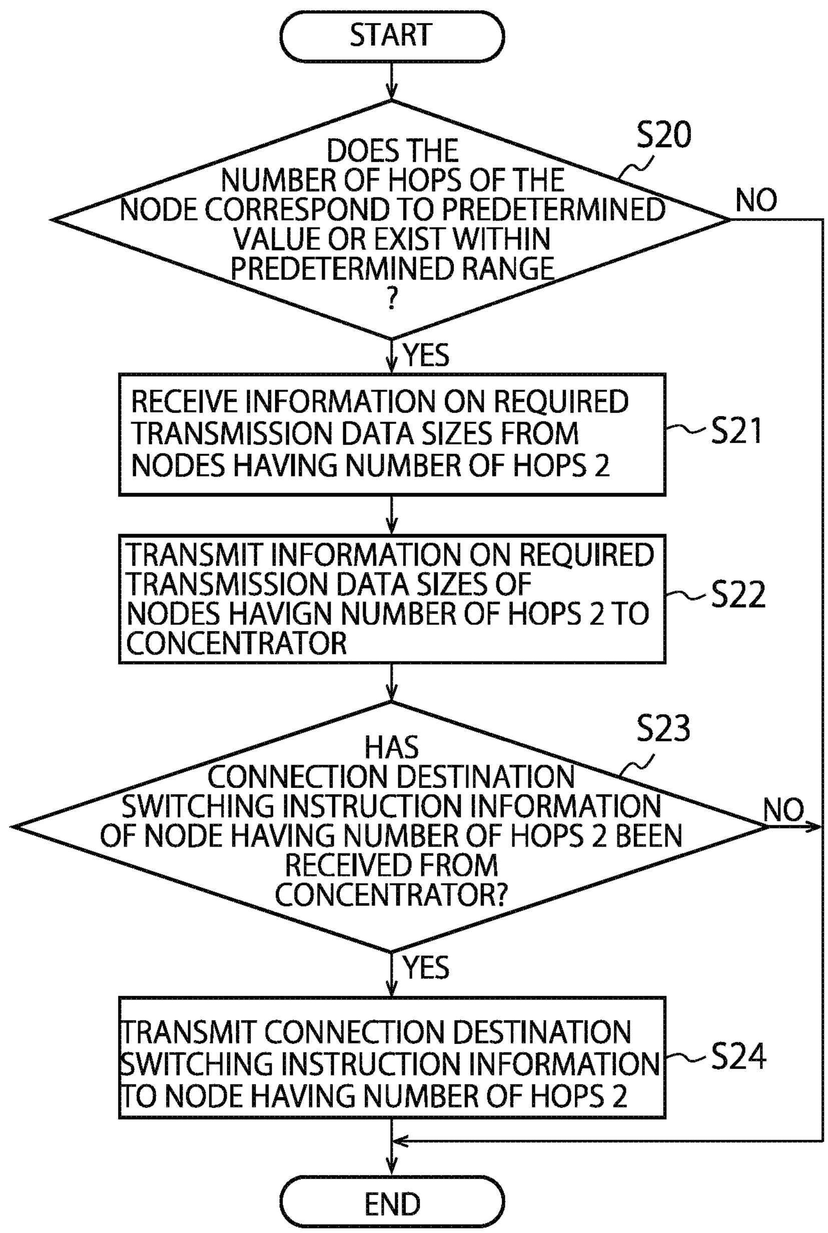
FIG. 16 is a flowchart of an operation example of the wireless node according to the first embodiment.

FIG. 16 is a flowchart of an operation example of a wireless node according to the present embodiment.

The wireless node judges whether or not the number of hops of the wireless node corresponds to a predetermined value or is within a predetermined range (S20). For example, if the predetermined value is 1, the wireless node judges whether the number of hops of the wireless node corresponds to 1. If the predetermined range is between 1 and 2, including 1 and 2, the wireless node judges whether or not the number of hops of the wireless node is 1 or 2. If the number of hops of the wireless node does not correspond to the predetermined value and is not within the predetermined range (NO), the wireless node ends the present process. On the other hand, if the number of hops of the wireless node corresponds to the predetermined value or is in the predetermined range (YES), the wireless node proceeds to step S21. Here, it is assumed that the predetermined value is 1, that the wireless node is a node having number of hops 1, and that a result of the judgment at step S20 is YES.

At step S21, the wireless node (a node having number of hops 1) collects, from nodes having number of hops 2 which are connected to the wireless node (child nodes), information on the required transmission data sizes of the child nodes.

At step S22, the node having number of hops 1 transmits the collected information on the required transmission data sizes to the concentrator 101.

At step S23, the node having number of hops 1 judges whether the node has received information specifying a node targeted by connection destination switching among the nodes having number of hops 2 connected to the node (the child nodes), and a node having number of hops 1 to which the node should newly connect (switching instruction information) as a response to the collected information on the required transmission data sizes. The switching instruction information is transmitted to the node having number of hops 1 if the concentrator 101 judges that the required transmission data size of the node having number of hops 1 exceeds an upper limit. Therefore, if the concentrator 101 judges that the upper limit is not exceeded, the switching instruction information is not transmitted. When the concentrator 101 judges that the required transmission data size does not exceed the upper limit, information showing that switching of the connection destination of a child node is unnecessary may be transmitted from the concentrator 101 to the node having number of hops 1. The node having number of hops 1 may determine that switching of the connection destination of a child node is unnecessary when receiving the information.

If not receiving the switching instruction information at step S23 (NO), the node having number of hops 1 ends the present process. On the other hand, if receiving the switching instruction information (YES), the node having number of hops 1 proceeds to step S24.

At step S24, the node having number of hops 1 transmits a switching instruction specifying a new connection destination node to the node having number of hops 2 specified in the switching instruction information. Receiving the switching instruction, the node having number of hops 2 switches the connection destination from the current node to the specified node (a node having number of hops 1).

As described above, according to the present embodiment, it becomes possible to efficiently perform route construction avoiding congestion by the concentrator 101 performing the route control (the parent node switching process) only for nodes with a small number of hops from the concentrator 101. If the route control is performed for nodes with the number of hops exceeding a predetermined number of hops, various kinds of communications (acquisition of information about required transmission data sizes, transmission of pieces of switching instruction information and the like) are required for the control even for remote nodes that cannot be communicated with without multi-stage relay. Therefore, the network load increases, and the possibility of failure in communication also increases. In the present embodiment, since the route control is performed only for nodes with a small number of hops (for example, having number of hops 2) from the concentrator 101, the network load is suppressed low, and route construction avoiding congestion can be executed at a high speed. Further, since it is a node close to the concentrator 101 that a lot of data concentrates in the wireless multihop network, it is rational to target such a node, and efficient control becomes possible.

Second Embodiment

In the first embodiment, at the time of selecting a child node to be targeted by connection destination switching from among child nodes connected to a congestion node among nodes having number of hops 1, any child node can be selected as far as the condition that the required transmission data sizes of all the nodes having number of hops 1 after switching are equal to or below an upper limit is satisfied. In the present embodiment, a child node is selected based on path costs after connection destination switching, in addition to the above condition. For example, a child node with the lowest path cost after switching is selected.

Figure 17:
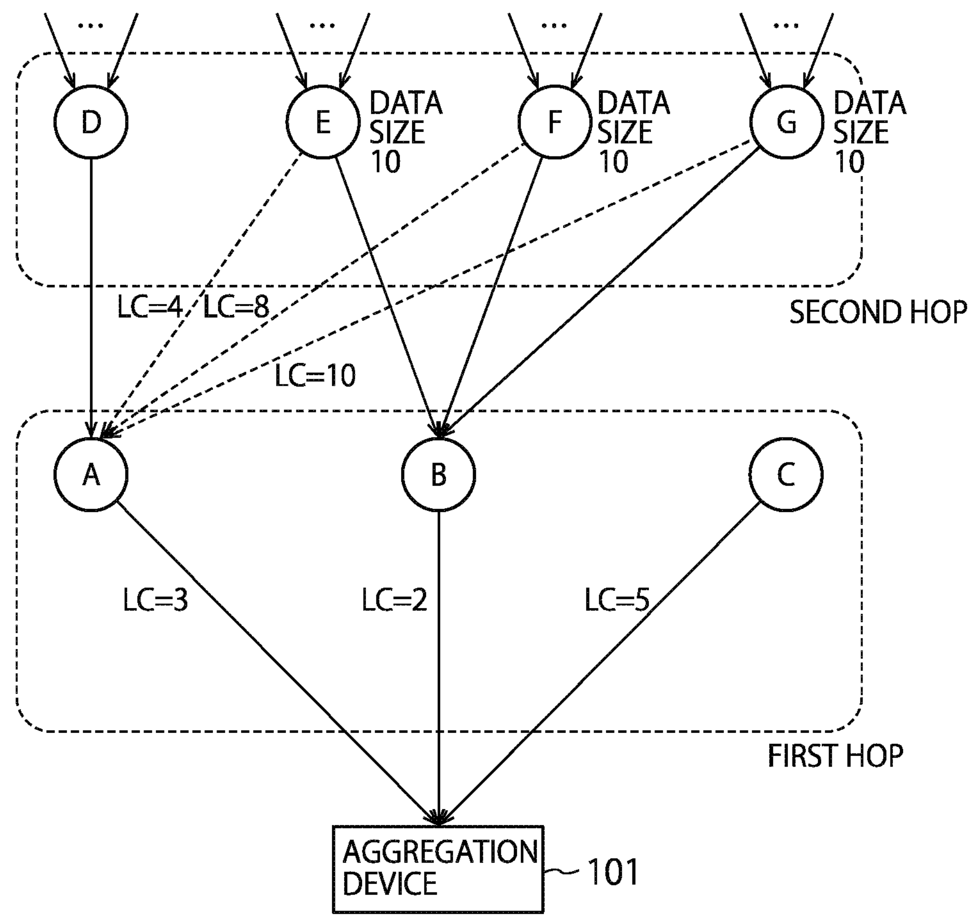
FIG. 17 is a diagram for illustrating an operation example of a second embodiment.

FIG. 17 is a diagram for illustrating an example of an operation related to route control according to the second embodiment. Nodes E, F and G having number of hops 2 are connected to a node B which is a parent node. The required transmission data size of each of the nodes E, F and G is 10, and a data size generated by the node B is 1. Since the required transmission data size of the node B is 31, the controller 66 of the concentrator 101 judges that the required transmission data size exceeds the upper limit (30). The controller 66 determines the connection destination of any of the nodes E, F and G is switched to a different node. As candidates for the different node, the nodes A and C are conceivable. The controller 66 judges that, no matter which is selected, the required transmission data size of the node does not exceed the upper limit. Therefore, one of the nodes A and C is selected by an arbitrary method. For example, there are a method of selecting a node with a lower cost required to reach the concentrator 101 between the nodes A and C, a method of randomly selecting one of the nodes A and C, and a method of selecting a node with a smaller number of child nodes between the nodes A and C. As another method, a method of selecting a node that is communicable with a larger number of nodes among the child nodes of the node B (E, F and G) between the nodes A and C is conceivable. Here, it is assumed that the node A is selected. It is assumed that the node A is communicable with all of the nodes E, F and G. That is, all of the nodes E, F and G are included in the communication area of the node A.

The controller 66 of the concentrator 101 determines which of the connection destinations of the nodes E, F and G is to be switched from the current parent node B to the node A. At this time, the concept of the path cost of ETX is used. Link costs between the node A and the nodes E, F and G in a case where the nodes E, F and G are switched to the node A are acquired. Information about the link costs of the nodes E, F and G can be acquired from the nodes E, F and G, respectively, via communication. In the example of FIG. 17, the link cost between the nodes E and A is 4; the link cost between the nodes F and A is 8; and the link cost between the nodes G and A is 10. By adding a link cost between the node A and the concentrator 101 to each link cost, each path cost is calculated. The path cost of the node E is 7; the path cost of the node F is 11; and the path cost of the node G is 10.

The controller 66 of the concentrator 101 preferentially selects a node with a smaller path cost. In this example, the lowest path cost is the path cost of 7 of the node E. Therefore, the concentrator 101 selects the node E from among the nodes E, F and G and determines that the connection destination of the node E is to be switched to the node A. After the determination, switching instruction information specifying that the connection destination of the node E is switched to the node A, to the node E via the node B similarly to the first embodiment. The node E switches the connection destination from the node B to the node A. Here, one node is selected as a node the connection destination of which is to be changed. When it is necessary to select two or more nodes, a node with a lower path cost can be also preferentially selected.

In the present example, after selecting the node A first as one of the nodes A and C, a node the connection destination of which is to be switched to the node A is selected from among the nodes E, F and G. However, it is also possible to calculate a path cost for each pair of one of the nodes A and C and one of the nodes E, F and G and select a pair with the lowest path cost. That is, a path cost is calculated for each of pairs of (A, E), (A, F), (A, G), (C, E), (C, F) and (C, G), and a pair with the lowest path cost is selected.

The concentrator 101 and the wireless node 102 in each embodiment may also be realized using a general-purpose computer device as basic hardware. That is, each function provided in the concentrator 101 and the wireless node 102 can be realized by causing a processor mounted in the above described computer device to execute a program. In this case, the concentrator 101 and the wireless node 102 may be realized by installing the above described program in the computer device beforehand or may be realized by storing the program in a storage medium such as a CD-ROM or distributing the above described program over a network and installing this program in the computer device as appropriate. Furthermore, the storage provided in the concentrator 101 and the wireless node 102 may also be realized using a memory device or hard disk incorporated in or externally added to the above described computer device or a storage medium such as CD-R, CD-RW, DVD-RAM, DVD-R as appropriate.

The terms used in each embodiment should be interpreted broadly. For example, the term "processor" may encompass a general purpose processor, a central processing unit (CPU), a microprocessor, a digital signal processor (DSP), a controller (controlling circuitry), a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

The term "storage" may encompass any device which can permanently memorize data using magnetic technology, optical technology or non-volatile memory etc. For example, the storage may be an HDD (Hard Disk Drive), an optical disc, an SSD (Solid State Drive) or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data management device collecting data from a plurality of wireless nodes in a wireless multihop network, comprising:

a transceiver configured to transmit and receive a radio signal; and controlling circuitry configured to determine a first range of numbers of hops from the data management device for execution of route control in the wireless multihop network, perform the route control for the first range of numbers of hops and not perform the route control beyond the first range of numbers of hops from the data management device, wherein the controlling circuitry acquires first pieces of information indicating data sizes of transmission of a plurality of first wireless nodes via relay in the wireless multihop network before the first wireless nodes transmit data to respective parent nodes, the plurality of first wireless nodes existing on an N-th hop (N is an integer equal to or larger than 2) from the data management device, and the N-th hop being included in the first range of numbers of hops;

determines a first node and a second node based on the first pieces of information, the first node required to switch a parent node and being part of the plurality of first wireless nodes, and the second node being a switching-destination parent node of the first node; and transmits second information instructing the first node to switch the parent node to the second node, to the first node via relay in the wireless multihop network.

2. The data management device according to claim 1, wherein, if the controlling circuitry fails to receive data from at least any of the wireless nodes in the wireless multihop network fails, the controlling circuitry performs a process for acquisition of the first pieces of information.

3. The data management device according to claim 2, wherein, if the controlling circuitry does not receive the data within a predetermined time, the controlling circuitry determines to have failed to receive the data.

4. The data management device according to claim 1, wherein the first pieces of information include third pieces of information identifying wireless nodes existing on the (N−1)th hop that the plurality of first wireless nodes existing on the N-th hop are communicable with; and the controlling circuitry determines the switching-destination parent node of the first node based on the third pieces of information.

5. The data management device according to claim 1, wherein the controlling circuitry calculates qualities of routes to the data management device in a case where the plurality of first wireless nodes existing on the N-th hop switch their parent nodes to nodes existing on the (N−1)th hop, and the controlling circuitry determines the first node and the second node based on the qualities of the routes.

6. The data management device according to claim 1, wherein the N is 2.

7. A wireless communication device corresponding to a first wireless node which is one of a plurality of wireless nodes in a wireless multihop network, the wireless communication device comprising:

a transceiver configured to transmit and receive a radio signal; and controlling circuitry configured to:

determine whether a number of hops of the first wireless node from a root node in the wireless multihop network is a first value or within a first range of numbers of hops, determine whether a data size of transmission of the first wireless node to a parent node exceeds an upper limit, transmit information showing the data size to a data management device corresponding to the root node before the controlling circuitry transmits data to the parent node if the number of hops is the first value or within the first range and the data size exceeds the upper limit, the data management device being adapted for execution of route control in the wireless multihop network, and switch the parent node of the first wireless node to a second node specified by second information if the controlling circuitry receives the second information from the data management device via relay in the wireless multihop network, the second information instructing the first node to switch the parent wireless node to the second node, and transmit the data to the second node after the parent node is switched to the second node.

8. A wireless multihop network comprising a plurality of wireless nodes and a data management device for collecting data from the plurality of wireless nodes, wherein the data management device comprises:

a transceiver configured to transmit and receive a radio signal; and controlling circuitry configured to:

acquire first pieces of information indicating data sizes of transmission of a plurality of first wireless nodes via relay in the wireless multihop network before the first wireless nodes transmit data to respective parent nodes, the first wireless nodes existing on N-th hop (N is an integer equal to or larger than 2) from the data management device, and N being smaller than a predetermined number of hops;

determine a first node and a second node based on the first pieces of information, the first node required to switch a parent node and being al of the plurality of first wireless nodes, and the second node being a switching-destination parent node of the first node; and transmit second information instructing the first node to switch the parent node to the second node, to the first node via relay in the wireless multihop network; wherein the first node switches the parent node of the first node to the second node specified by the second information when the first node receives the second information.

* * * * *